United States Patent [19]

Smith

[11] 4,038,969

[45] Aug. 2, 1977

[54] SOLAR ENERGY COLLECTOR

[76] Inventor: Philip D. Smith, 385 Camelback Road, Pleasant Hill, Calif. 94523

[21] Appl. No.: 525,407

[22] Filed: Nov. 20, 1974

[51] Int. Cl.² .............................................. F24J 3/02
[52] U.S. Cl. ..................................... 126/270; 126/271
[58] Field of Search ................... 126/270, 271; 60/641; 165/170; 237/1 A

[56] References Cited

U.S. PATENT DOCUMENTS

| 201,439 | 3/1878 | Moreau | 126/270 |
|---|---|---|---|
| 2,680,437 | 6/1954 | Miller | 126/270 |
| 3,875,925 | 4/1975 | Johnston | 126/270 |
| 3,920,413 | 11/1975 | Lowery | 126/270 |
| 3,939,818 | 2/1976 | Hamilton et al. | 126/271 |

Primary Examiner—Kenneth W. Sprague
Assistant Examiner—James C. Yeung
Attorney, Agent, or Firm—Flehr, Hohbach, Test, Albritton & Herbert

[57] ABSTRACT

A solar collector is disclosed which collects radiant energy for transfer as thermal energy to a fluid with high efficiency. An energy absorbing structure is mounted between a transparent front panel and opaque back panel of a housing. The energy absorbing structure comprises a plurality of open-ended cells having parallel axes which are oriented at right angles to the transparent panel for receiving the radiant energy. Pairs of adjacent cells share common sidewalls to achieve a high surface area to frontal area ratio. The surfaces of the sidewalls have a high absorbtivity coefficient for efficiently absorbing the radiant energy, and the sidewalls have a high thermal conductivity for efficiently transfering thermal energy to a fluid which is directed through the cells. In one embodiment the cells are polygonal in cross-section to form a honeycomb structure, and in another embodiment the cells are substantially circular in cross-section. Means is provided to direct a fluid such as air or water into the housing and through the cells in heat exchange relationship with the sidewalls for absorbing and carrying away the energy collected by the cells.

8 Claims, 5 Drawing Figures

U.S. Patent  Aug. 2, 1977  4,038,969
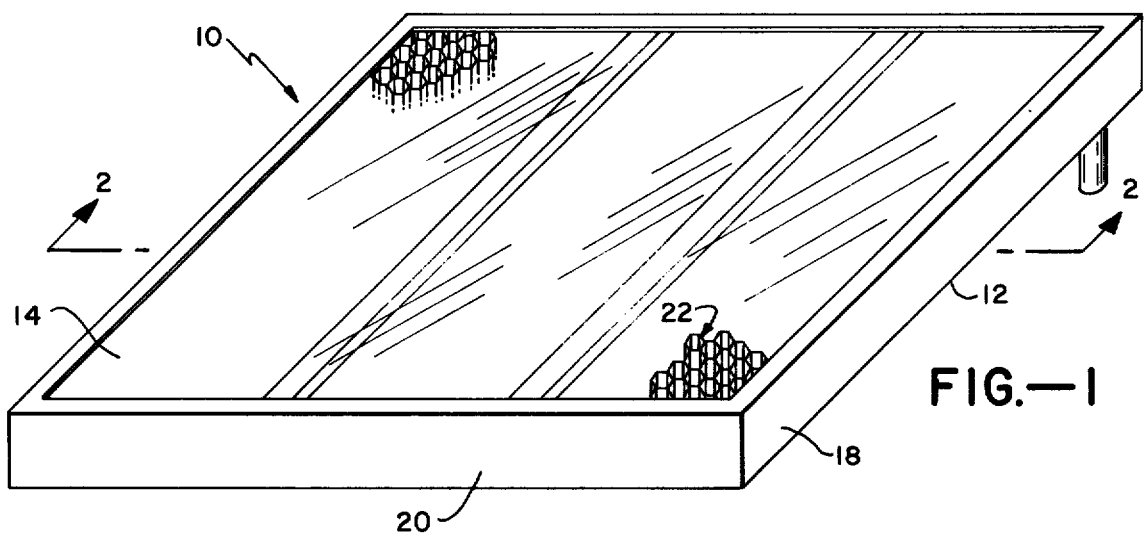
FIG.—1
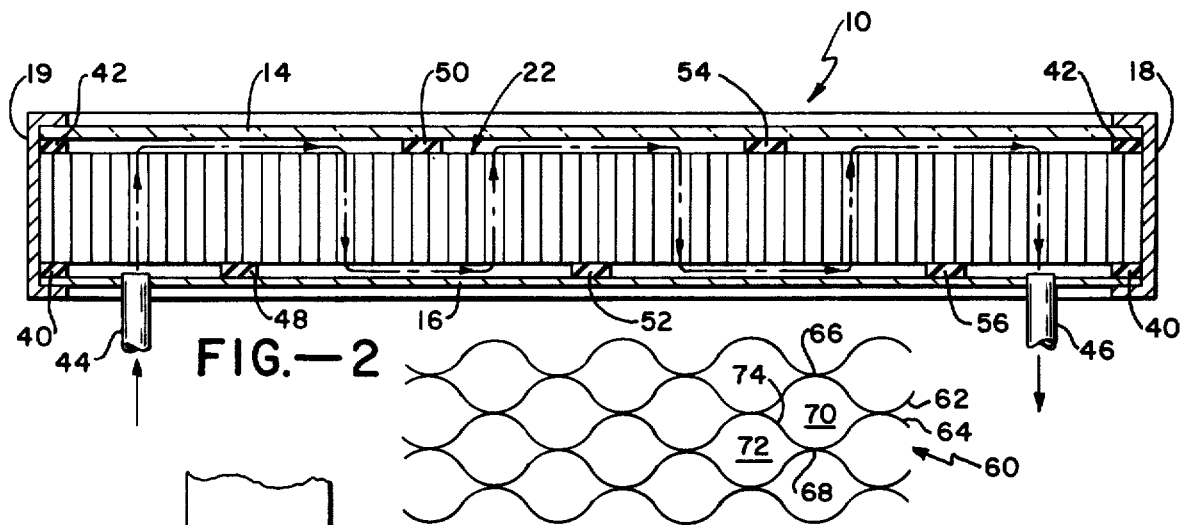
FIG.—2
FIG.—5
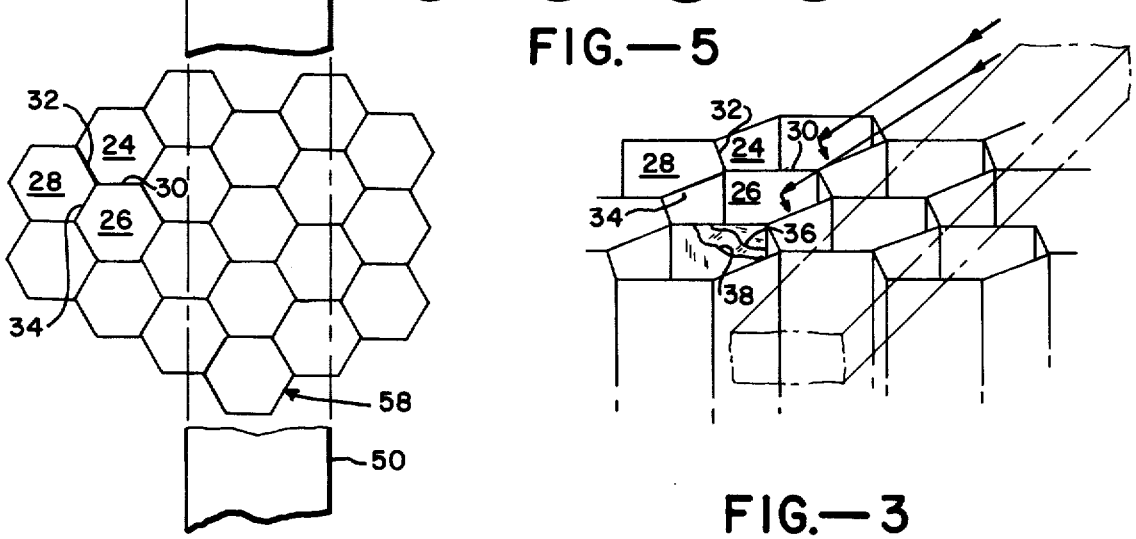
FIG.—4
FIG.—3

SOLAR ENERGY COLLECTOR

BACKGROUND OF THE INVENTION

This invention relates to radiant energy collecting devices, and in particular relates to solar energy collectors adapted to be arrayed in a flat orientation.

Many different solar collector devices have been developed in the prior art for collecting and utilizing radiant energy received from the sun. Devices known as flat plate collectors have been provided in which a flat array of plates is oriented to absorb the sun's rays, and a fluid is passed in heat exchange relationship with the plates to collect and carry away the thermal energy. However, such prior art devices have not achieved a high degree of efficiency in collecting the available solar energy. As a result the temperature of the outlet fluid has not been high. Furthermore for any given rate of energy production it has been necessary to build a collector structure having a total plate area of large dimensions with the result that the cost is high in relation to the output energy rate while space utilization is low. The development of a more efficient solar collector would assist in relieving the energy shortage, and would also make it feasible to employ currently unused spaces for collecting such energy, such as on the spaces on the walls of a building or other structure.

OBJECTS AND SUMMARY OF THE INVENTION

It is a general object of the invention to provide a new and improved solar energy collector which is more efficient in absorbing radiant energy and converting it into thermal energy. A more particular object is to provide a more efficient solar energy collector of the flat plate type.

It is another object of the invention to provide a solar energy collector of the type described having a cellular construction which more efficiently absorbs radiant energy and more efficiently transfers that energy through heat exchange to a fluid for subsequent utilization.

Another object is to provide a solar energy collector of the type described wherein the energy collecting structure is formed of a plurality of cells arranged to have a relatively high surface area to frontal area ratio for more efficiently collecting radiant energy and transfering it as thermal energy to a fluid.

Another object is to provide a solar energy collector of the type described in which the energy collecting structure is arranged so that the heat exchange fluid completely encloses the surfaces which collect the solar energy.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a perspective view of one embodiment of a solar energy collector having a flat configuration;

FIG. 2 is a cross-sectional view of the collector of FIG. 1;

FIG. 3 is a perspective view to an enlarged scale showing the cells of the collector structure of the embodiment of FIGS. 1 and 2;

FIG. 4 is a fragmentary top plan view of the cell collector structure of the first embodiment; and FIG. 5 is a fragmentary top plan view of another embodiment of the invention illustrating another configuration of the cell collector structure.

DESCRIPTION OF THE PREFERRED EMBODIMENTS

In the drawings FIG. 1 illustrates generally at 10 a device for collecting energy from a source of radiant energy, such as the sun. The device includes a housing 12 of a relatively flat, rectangular configuration, although other configurations such as circular, oval or the like could be employed depending upon the available space, or upon aesthetic requirements.

Housing 12 is comprised of a transparent front panel 14 of a suitable material such as glass or a clear plastic, and a spaced-apart opaque back panel 16, both of which are supported about their peripheries by opaque sidewalls 18, 20.

An energy absorbing structure 22 is disposed within the enclosure defined by housing 12, and the structure 22 comprises a plurality of cells 24, 26, 28 which extend along parallel axes generally orthogonal to the plane of front panel 14. In the embodiment of FIGS. 1-4 the cross-sectional configuration of the cells is hexagonal so as to form a honeycomb-type structure. The cells are defined by flat sidewalls 30, 32, 34 formed of a material having a relatively high thermal conductivity ($k$), such as copper which has a $k$ value of 0.91 cal/sec/cm²/C°. Another material which could be used for the sidewalls is aluminum which has a $k$ value of 0.50 cal/sec/cm²/c°. Adjacent pairs of the cells share a common sidewall, e.g., cells 24 and 26 share sidewall 30 while cells 26 and 28 share sidewall 34. As a result thermal energy absorbed on one surface of a sidewall is quickly transferred across to the opposite surface of that sidewall so that both surfaces can share in transferring energy to a heat exchange fluid passing through the cells.

Energy absorbing structure 22 is dimensioned with a cell depth to diameter ratio in the range of 2 to 10. This provides a relatively high ratio of plate surface area to frontal area, and because convection heat flow is proportional to surface area the result is a very high efficiency in the transfer of available radiant energy to the fluid as thermal energy. In one specific example of the embodiment of FIGS. 1-4 the hexagonal cells are sized with nominal diameters, i.e., the distance between the opposite apexes of the hexagon, of ⅛ inch and with a cell height of 1 inch. The total frontal area of each cell is thus 0.0168 in ², the area of a single sidewall is 0.0801 inch and the total plate area for one cell is 6 × 0.081 inch = 0.4806 inch. This configuration creates a cell depth to diameter ratio of eight, and a surface area to frontal area ratio of 28.60. A cell nominal diameter of ¼ inch and cell height of 1 inch would produce a cell depth to diameter ratio of four and a surface area to frontal area ratio of 15.61.

The cell depth dimension of one inch is considered preferred because it is high enough to effectively absorb light rays which impinge upon the cells at a non-perpendicular angle through multiple rebounds off the sidewalls, as depicted in FIG. 3. Because approximately 96% of the incident radiant energy is absorbed during each impingement on a sidewall, cells deeper than one inch are not justified from cost considerations in that most of the energy is absorbed after the light is reflected once and then impinges upon one other sidewall. Light which is perpendicular, or nearly so, as it enters the cells is either substantially directly absorbed when it impinges upon back panel 16, or when it impinges upon a sidewall and is then reflected against the back panel.

The surfaces of the cell sidewalls are covered with a layer of material having a relatively high ratio of absorbtivity coefficient ($\alpha$) to emissivity coefficient ($\epsilon$). Preferably this layer is a combination of an underlying layer 36 of bright nickel together with an overlying, relatively thin layer 38 of black nickel. The bright nickel/black nickel combination provides an absorbtivity coefficient of 0.96, and an emissivity coefficient of 0.06, to result in an $\alpha/\epsilon$ ratio of 16.5. The inner layer 36 of bright nickel does not emit energy in the infrared band of the spectrum so that energy is not lost through re-radiation. The outer layer 38 of black nickel has a thickness on the order of a few microns so that it is an effective absorber in the short or visable wavelengths, and also is a good thermal conductor into the underlying bright nickel layer. The two layers in combination thus exhibit a relatively high $\alpha/\epsilon$ ratio for maximum efficiency in absorbing incident radiant energy.

The cellular configuration of energy absorbing structure 22 is completely enclosed by the flow of a suitable transparent heat exchange fluid, such as a gas, e.g., air, or a liquid, e.g., cold water. The result is that all of the surfaces upon which the light impinges for absorbing radiant energy are directly in contact with the heat exchange fluid to more efficiently produce heat exchange by convection, and to eliminate hot spots which could re-radiate energy from the collector. Moreover, the thin-walled cellular configuration results in thermal energy which is absorbed from light impinging on one surface of a sidewall being quickly conducted across to the opposite surface so that both surfaces share in transfering the thermal energy to fluid passing through the cells.

Energy absorbing structure 22 is mounted within housing 12 by means of spacers 40, 42 so that the open front ends and open read ends of the cells are in spaced-apart relationship from the respective transparent panel 14 and back panel 16. The spacing which is thereby formed between the cells and front and back panels provides passageways for the flow of the heat exchange fluid. The fluid is directed into the housing from a suitable pump, not shown, through an inlet conduit 44 and is directed from the housing through an outlet conduit 46. A plurality of laterally extending baffles 48-56 are mounted on opposite sides of the cells between the front and back panels. The baffles are staggered in the direction of flow of the fluid so that the fluid is directed in series through adjacent sections of the cells with the flow in each section of cells being in parallel. While the series flow developes a higher fluid outlet temperature, the flow could also be in parallel through all cells by elimination of the baffles and by mounting the outlet conduit on the opposite side of the inlet conduit. As shown in FIG. 2 the baffle 48 directs flow from the inlet conduit upwardly in parallel flow through the section of cells at the left-hand portion of structure 22. The fluid then flows along the space across the front ends of the cells where it is directed downwardly by baffle 50 in parallel flow through the next section of cells. The flow continues in this circuitous path until it discharges from the right-hand section of cells into outlet conduit 46.

Each of the baffles is sized with a width which is substantially equal to the combined lateral width of two cells so as to preclude fluid leakage under the baffles at their junctures with the cell ends. As illustrated in FIG. 4 the typical baffle 50 is shown as laying across the ends of the cells so as to completely close of the column of cells 58.

As desired a layer of suitable insulation material, not shown, may be placed underneath back panel 16 for minimizing heat losses by radiation and convection from the back of device 10. In addition, an outer transparent panel, not shown, may be mounted in spaced relationship in front of panel 14 to minimize heat losses by convection from the front.

FIG. 5 illustrates another embodiment of the invention in which an energy absorbing structure 60 is provided with a substantially circular cross-sectional cell configuration. Preferably this structure is formed by securing together corrugated sheets 62, 64 of a suitable high thermal conductivity material, such as copper, and the surfaces of the sheets are covered with a material having a high $\alpha/\epsilon$ ratio, such as black nickel over bright nickel. As illustrated in FIG. 5 the ridges 66, 68 of adjacent sheets are in contact to form the cells 70, 72 so that adjacent pairs of the cells share a common sidewall 74 in a manner similar to that described for the embodiment of FIGS. 1-4. Energy absorbing structure 60 of this embodiment is mounted within a housing in a manner similar to that described for the previous embodiment.

In operation of the invention solar collector 10 is mounted on a suitable foundation, such as the sidewall of a building, in an orientation to receive the rays of the sun. A heat exchange fluid such as cold water is forced by a pump through inlet conduit 44, with outlet conduit 46 being connected in a circuit with the desired end use application, such as a hot water storage tank or steam engine or turbine where the device is used as a steam generator. Incident radiant energy from the sun passes through transparent front panel 14 and strikes the collector structure 22. The front panel cooperates with back panel 16 and the baffles 48-56 to direct the flow of heat exchange fluid in a circuitous flow through the cells. When the rays of light strike the collector at a non-perpendicular angle they impinge upon the sidewalls of the cells and reflect to opposite sidewalls in a manner illustrated in FIG. 3, with the radiant energy being substantially absorbed by the bright nickel/black nickel layers 36 and 38. Radiant energy which strikes the collector at substantially a perpendicular angle and passes through the open ends of the cells impinges upon and is absorbed on the upper surface of back panel 16.

The heat exchange fluid directly contacts the surfaces which receive radiation for a more efficient heat transfer by convection. Energy which is absorbed in the outer layers of the cells is also quickly conducted through the sidewalls so that both surfaces of each sidewall are available to transfer thermal energy to the fluid. The efficiency of transfer of thermal energy to the fluid is high as a result of the relatively high ratio of surface area to frontal area provided by the invention. Moreover, hotspots are eliminated on the heat transfer surfaces.

I claim:

1. A flat plate radiant energy collector comprising the combination of a housing having a transparent front panel and an opaque black panel, an energy absorbing structure mounted within the housing, said structure comprising a plurality of cells each of which is defined by opaque, radiant energy absorbing sidewalls extending along parallel axes substantially orthogonal to the plane of the front panel with adjacent pairs of the cells sharing at least a common sidewall, each of the cells having an open front end spaced from the front panel and an open rear end spaced from the back panel whereby radiant energy which passes through the front panel impinges upon and is absorbed as thermal energy on the cell sidewalls and on the back panel, with the ratio of the depth of the cells to the diameter of cells being in the range of 2 to 10, and means for directing fluid into the housing through the cells in heat exchange relationship with the sidewalls and with the back panel for absorbing said thermal energy thereon.

2. A flat radiant energy collector comprising the combination of a housing having a laterally extending transparent front panel and an opaque back panel, an energy-absorbing structure mounted within the housing, said structure comprising a plurality of cells each of which is defined by opaque, radiant energy-absorbing sidewalls extending along parallel axes which are transverse to the plane of the front panel with adjacent pairs of cells sharing at least a common sidewall, each of the cells having an open front end spaced from the front panel and an open rear end spaced from the back panel whereby radiant energy which passes through the front panel impinges upon and is absorbed as thermal energy on the cell sidewalls and on the back panel, said sidewalls being effective to absorb the radiant energy passing through the front panel, and means for directing fluid into the housing and through the cells in heat exchange relationship with the sidewalls and back panel for absorbing said thermal energy therefrom.

3. An energy collector as in claim 2 in which the sidewalls are covered with a layer of material having a ratio of absorbtivity coefficient to emissivity coefficiency on the order of 16.

4. An energy collector as in claim 2 in which said cells have a polygonal cross-sectional configuration.

5. An energy collector as in claim 4 in which said cells have a hexagonal cross-sectional configuration whereby the plurality of cells forms a honeycomb-type structure with the common sidewalls of adjacent cells forming a side of the hexagonal configuration.

6. An energy collector as in claim 1 in which said cells have a polygonal cross-sectional configuration.

7. An energy collector as in claim 6 in which said cells have a hexagonal cross-sectional configuration whereby the plurality of cells forms a honeycomb-type structure with the common sidewalls of adjacent cells forming a side of the hexagonal configuration.

8. A flat plate collector as in claim 1 in which said ratio is on the order of eight and the ratio of the total surface area of the sidewalls with respect to the total frontal area of the cells is on the order of 28.

* * * * *